United States Patent [19]

Howard et al.

[11] Patent Number: 5,732,365
[45] Date of Patent: Mar. 24, 1998

[54] METHOD OF TREATING MIXED WASTE IN A MOLTEN BATH

[75] Inventors: Robert A. Howard, Williston, N. Dak.; H. C. Jordan, Roberts, Mont.

[73] Assignee: Dakota Catalyst Products, Inc., Williston, N. Dak.

[21] Appl. No.: 550,017

[22] Filed: Oct. 30, 1995

[51] Int. Cl.$^6$ ........................................ G21F 9/00
[52] U.S. Cl. .................. 588/10; 588/15; 588/201; 588/252; 501/155; 976/DIG. 385
[58] Field of Search ........................ 588/10, 201, 252, 588/15, 11; 501/155; 976/DIG. 385

[56] References Cited

U.S. PATENT DOCUMENTS

| | | |
|---|---|---|
| 2,914,399 | 11/1959 | Dwyer et al. |
| 3,154,379 | 10/1964 | Benedict et al. |
| 3,282,681 | 11/1966 | Knighton et al. |
| 3,420,639 | 1/1969 | Mullins et al. |
| 3,495,975 | 2/1970 | Grimes et al. |
| 3,672,846 | 6/1972 | McNeese et al. |
| 3,708,267 | 1/1973 | Avogadro .................... 423/5 |
| 3,781,403 | 12/1973 | Baes, Jr. et al. |
| 4,145,396 | 3/1979 | Grantham .................... 423/22 |
| 4,274,976 | 6/1981 | Kingwood |
| 4,314,909 | 2/1982 | Beall et al. |
| 4,395,367 | 7/1983 | Rohrmann et al. |
| 4,574,714 | 3/1986 | Bach et al. ................. 110/346 |
| 4,591,454 | 5/1986 | Ohtsuka et al. ............. 252/626 |
| 4,602,574 | 7/1986 | Bach et al. ................. 110/346 |
| 4,657,585 | 4/1987 | Yazawa et al. ................ 75/63 |
| 4,895,678 | 1/1990 | Ohtsuyuki et al. |
| 5,013,533 | 5/1991 | Howard et al. ............... 423/133 |
| 5,014,193 | 5/1991 | Grantham .................... 204/1.5 |
| 5,202,100 | 4/1993 | Nagel et al. .................. 423/5 |
| 5,348,567 | 9/1994 | Chappell ................... 75/10.66 |
| 5,405,429 | 4/1995 | Rey et al. ................... 75/434 |
| 5,461,185 | 10/1995 | Forsberg et al. ............. 588/11 |
| 5,489,734 | 2/1996 | Nagel et al. .................. 588/1 |

FOREIGN PATENT DOCUMENTS 55-44917 of 1980 Japan.

OTHER PUBLICATIONS

C.R. Cooley et al., Comparison of Integrated Systems for the Treatment of Doe Mixed Waste, date Unknown, pp. 1–8.
U.S. Dept. of Energy, Environmental Technology Development Through Industry Partnership, Oct. 1995, Agenda, Abstracts, and Visuals.
Fred Feizollahi, et al., Integrated Thermal Treatment System Study–Phase 2 Results, Aug. 1995, pp. 2–17&18, pp. 2–61/64, pp. 5–26/29, pp. 6–19/21.

*Primary Examiner*—Ngoclan Mai
*Attorney, Agent, or Firm*—Watts, Hoffmann, Fisher & Heinke, Co., L.P.A.

[57] ABSTRACT

A method of treating a waste material, such as a radioactive waste material, by introducing the material into a high temperature reaction vessel such as an electric arc furnace. By controlling the reducing potential of the oxide phase formed in the reaction vessel, the concentration of the waste material in the oxide phase can be controlled. In addition, the morphology of the oxide phase can be controlled so that once the concentration of the waste material in the oxide phase is adjusted as desired, the waste material can be sequestered within the crystal lattice of the cooled oxide phase for subsequent disposal.

35 Claims, 1 Drawing Sheet

METHOD OF TREATING MIXED WASTE IN A MOLTEN BATH

BACKGROUND OF THE INVENTION

Toxic or hazardous wastes, including radioactive wastes, currently present a significant threat to the environment. Current treatment and disposal methods are costly and do not provide the ability to treat broad spectrum wastes in a single process. Much of the waste, although processed into more acceptable forms for disposal, remains toxic and hazardous due to a continuing danger of leaching into the environment after disposal. Mixed low-level waste (MLLW) presents the particular problem of having to treat waste streams which consist of toxic or contaminated organic and inorganic solids, hazardous heavy metals, and liquids, as well as radioactive constituents. Although incineration is currently the best technology for treating mixed low-level radioactive wastes, it requires numerous specialized subsystems to treat the wide variety of wastes. Moreover, because of the variety of wastes found in MLLW it is difficult to treat a waste stream without particular regard to the nature and size of the constituents. Currently, waste separation and characterization is among the largest costs items associated with the treatment of mixed low-level waste.

Moreover, current methods of waste treatment provide limited flexibility as to the nature of the final product and the disposition of specific waste constituents. The inability to control the nature and disposition of specifically regulated waste components results in increased costs associated with supplemental processing and disposal requirements.

There is currently a need for an economical method of treating mixed low-level waste that can accommodate a wide range of sizes and shapes of input materials having a broad range of chemical and radioactive characteristics. Likewise, such a system should be versatile and provide a large degree of control in determining the disposition of selected waste constituents. The present invention provides such a system.

SUMMARY OF THE INVENTION

The present invention provides a method and system for treating hazardous waste streams that is especially suited to the treatment of mixed low-level radioactive wastes comprised of a wide variety of toxic or contaminated organic solids and liquids, inorganic solids including hazardous heavy metals and radioactive components of varying size and shape. The present invention can synthesize an extremely heterogeneous mixture of wastes into desired, predictable products, the nature and characteristics of which can be easily controlled. Hence, much of the cost associated with waste separation and characterization is eliminated. Moreover, depending upon the nature of the sequestrant used, hazardous metal wastes, including radioactive metals, can be sequestered in extremely stable, hard, non-leachable product forms such as monoliths, ingots and the like. In some instances, the product can be tailored so that the sequestrant provides an inherent shielding effect against the radioactivity of the sequestered waste material within. Of course, while the method of the invention is particularly advantageous with respect to the treatment of mixed low-level waste, the process is not limited thereto. It is contemplated that single source waste streams, such as uranium, depleted uranium, plutonium and the like, as well as mixed high-level waste can be effectively treated in accordance with the invention. In one aspect of the invention there is provided a method of treating a waste material comprising forming a molten bath comprising a waste material and a fluid oxide sequestrant phase in a reaction vessel, whereby at least a portion of the waste material is interspersed in the oxide sequestrant phase. The concentration of the waste material in the oxide sequestrant phase is adjusted by increasing the reducing potential of the oxide sequestrant phase, increasing the amount of oxide sequestrant or both. The product is then formed by removing at least a portion of the oxide sequestrant phase from the reaction vessel when the concentration of waste material in the oxide sequestrant phase is at a desired level, and solidifying the withdrawn oxide sequestrant phase at a rate effective to sequester the waste material therein.

In one embodiment, the step of adjusting the concentration of waste material comprises increasing the reducing potential of the oxide sequestrant phase by introducing a reducing agent into the reaction vessel. Preferably, the reducing agent is introduced directly into said oxide sequestrant phase. In another embodiment, the step of adjusting the concentration of waste material comprises increasing the amount of the oxide sequestrant phase by the addition of oxide sequestrant or a precursor therefor. For example, if the desired sequestrant is mullite, then alumina and/or silica may be added as precursors to form mullite. In yet another embodiment, the reducing potential of the oxide sequestrant phase may be increased by changing the temperature in the reaction vessel. In another embodiment of these aspects of the invention, the waste material comprises at least one component of a multi-component waste composition.

In another aspect of the invention there is provided a method of treating a waste material comprising forming a molten bath comprising a waste material and a fluid oxide sequestrant phase in a reaction vessel. The concentration of the waste material in the oxide sequestrant phase is adjusted by adjusting at least one of the reducing potential or amount of said oxide sequestrant phase. In this embodiment, the composition of the oxide sequestrant phase is adjusted so as to form a non-vitreous, crystalline structure upon solidification. Thereafter, at least a portion of the oxide sequestrant phase is removed from the reaction vessel when the concentration of the waste material in the oxide sequestrant phase is at a desired level, and solidified at a rate effective to sequester the waste material within the non-vitreous, crystalline structure of the oxide sequestrant phase. The step of adjusting the concentration of waste material comprises increasing the reducing potential of said oxide sequestrant phase, preferably by introducing a reducing agent directly into said oxide sequestrant phase, or decreasing the reducing potential of said oxide sequestrant phase, preferably by introducing an oxidizing agent directly into the oxide sequestrant phase.

In one embodiment of this aspect of the invention, the oxide sequestrant phase is formed from a composition comprising alumina and silica, and the step of adjusting the composition of the oxide sequestrant phase to form a non-vitreous, crystalline structure upon solidification is performed by increasing the ratio of alumina to silica in said oxide sequestrant phase. Preferably, this is done by increasing the reducing potential of said oxide sequestrant phase.

It is yet another aspect of the invention to provide a method of treating a multi-component waste composition. In this aspect of the invention, the waste composition is preheated to volatize at least one component thereof and, thereafter, at least a portion of the waste composition is charged to a reaction vessel to form a molten bath comprising at least a portion of the waste composition and a fluid oxide sequestrant phase. The concentration of at least one component of the waste composition in the oxide sequestrant phase is adjusted by adjusting at least one of the reducing potential and amount of said oxide sequestrant phase. The final product is formed by removing at least a portion of the oxide sequestrant phase from the reaction vessel when the concentration of said at least one component of the waste composition is at a desired level, and solidifying it at a rate effective to sequester said at least one component of the waste composition within said solidified oxide sequestrant phase. Preferably, the pre-heating is conducted in an oxidizing atmosphere. In one embodiment, the charging of the pre-heated waste is conducted after said waste has been cooled and analyzed. In another embodiment, after pre-heating, the waste is oxidized in a fluidized bed prior to being charged to the reaction vessel.

As in the preceding embodiment, the step of adjusting the concentration of waste material comprises increasing the reducing potential of the oxide sequestrant phase, preferably by introducing a reducing agent directly into said oxide sequestrant phase, decreasing the reducing potential of said oxide sequestrant phase, preferably by introducing an oxidizing agent directly into said oxide sequestrant phase, or adjusting the amount of oxide phase or its precursor.

In one embodiment, at least a portion of the oxide sequestrant phase may be formed by melting the waste composition. Hence, the waste material and the fluidized oxide phase may be the same material. In a preferred embodiment, the oxide sequestrant phase is formed predominantly from an alumina. Still more preferably, the alumina is selected so as to form mullite or a spinel upon solidification. In another preferred embodiment, the waste material is selected to be a radioactive waste material. In a particularly preferred embodiment, the composition of said oxide sequestrant phase is adjusted so as to form a non-vitreous, crystalline structure incorporating said waste material upon solidification.

DISCLOSURE OF THE INVENTION

The preferred embodiment of the invention lies in a method of controlling the disposition of various waste constituents in a reaction vessel containing a molten bath comprised of melted waste material and a fluid oxide layer or phase which ultimately functions as a sequestrant for selected waste constituents. In this way, the products produced by the method of the invention can be narrowly tailored to fall within specified regulatory guidelines for subsequent use or disposal.

In accordance with the method of the invention, the nature and composition of the final product desired after treatment of the mixed waste stream is controlled depending upon the particular waste component sought to be disposed of, and the particular manner of disposition required. The Land Disposal Restrictions (LDR), and other state and federal regulatory requirements, dictate what can be done with certain waste constituents. Hazardous metals, for example, must generally either be removed from the waste stream and subsequently processed for disposal in accordance with particular guidelines, or sequestered in some non-leachable form as required by LDR for disposal in, for example, land fills or underground storage facilities. Likewise, the concentration of various waste constituents in a given disposal unit, for example the radioactivity per ingot, is also frequently regulated. The present method facilitates compliance with such regulations in a controllable, economical manner.

Based on chemical analysis of the waste composition to be fed to the molten bath, and by monitoring the composition produced, the method of the invention provides a means of tailoring the chemical composition of the oxide phase by adjusting the concentrations of selected target elements therein to fall within acceptable regulatory guidelines, such as the LDR guidelines, and thereafter fix or sequester the target waste in the oxide phase for subsequent disposal. Advantageously, many of the metals that end up in the metallic phase in the reaction vessel can thereafter be recovered and sold for subsequent use or further processed for disposal. A significant advantage of the inventive method and system is that it enables the controllable reduction of highly heterogeneous waste streams into predictable, highly desirable products, some of which are recyclable and others of which are environmentally sound waste forms.

Hazardous wastes in general, and mixed low-level wastes (MLLW) in particular, are composed of various organic and inorganic constituents. Inorganic constituents may include, for example, hazardous heavy metals, group I and group II metals, actinides, lanthanides, and various radioactive isotopes and oxides thereof. Organic constituents may include, for example, PCB's, organo-halides, fluorocarbons, PVC, and the like. When introduced into a high temperature reaction vessel, such as a steel making furnace, the constituents of the waste composition melt and separate, with some volatizing and seeking equilibrium in a gas phase, while others seek equilibrium in a molten oxide phase or a molten metallic phase. The particular phase in which a given waste constituent exists depends upon the conditions of temperature and pressure in the reactor vessel, as well as the materials therein.

Whether or not any given constituent will tend to seek equilibrium in the oxide phase or the metal phase depends in part on the standard free energy of formation of the oxide of that particular constituent at the particular temperature in the reactor vessel. Compounds having high free energies of formation will tend toward the oxide phase, while compounds with low free energies will tend toward the metallic phase. In a graph of standard free energies of formation versus temperature, for example, as published on page 162–63 of *Extraction Metallurgy*, 2nd Ed., J. D. Gilchriest, Pargamon Press (1980), incorporated herein by reference, metals are oxidizers or reducers with respect to one another depending upon their relative free energies and, hence, location on the plot. For example, a given metal will tend to oxidize a metal having a higher free energy of formation, and tend to reduce a given metal having a lower free energy. Thus, the equilibrium in the reaction vessel will depend not only on the presence or absence of oxidizing agents, such as oxygen gas, or reducing agents, such as carbon, coke, natural gas and the like, but also on the particular constituents of the metallic and oxide phases. Based on this general principle, and an understanding of the constituents of the bath, the particular control parameter to be employed in accordance with the inventive method can be ascertained.

Advantageously, the inventors have discovered how to manipulate the conditions in the reactor to control the characteristics of the oxide phase and thereby employ it as a means of entrapping or sequestering desired waste materials for safe and effective disposal, while at the same time recovering other waste materials in reusable form. In addition, by appropriately selecting and controlling the nature of the oxide phase in accordance with the invention, one can not only tailor the composition of the final product, i.e., the solidified waste-sequestrant composite, to fall within regulatory guidelines of concentration and leachability, but radioactive constituents can in some instances be sequestered in such a fashion that the sequestrant acts as a natural shield against the radioactivity of the sequestered material.

Depending upon the particular product desired, and hence the target element or elements to be controlled, the method of the invention will selectively adjust the amount of oxide sequestrant in the oxide phase, the reduction potential of the oxide phase or both. Adjusting the reducing potential in turn controls whether a given element will remain in the oxide phase. Thus, by adjusting the amount and reducing potential of the oxide phase, one can adjust the concentration of a given waste material in the oxide phase. Controlling the entire system in the reaction vessel by controlling the reducing potential of the oxide phase, rather than the metallic phase, is advantageous. Since the oxide phase is in intimate contact with both the gas phase and the metallic phase, control over the entire system is easily affected by the oxide phase, particularly at the high temperatures associated with the present method. Moreover, the apparatus necessary to treat the oxide phase is more economical than that required to directly control the metallic phase. Likewise, the nature or morphology of the oxide phase can be adapted in this manner to provide a desirable sequestrant morphology, which can be selected for optimum performance depending on the particular waste constituent to be disposed of, the relevant regulatory guidelines therefor, the economics of the process and the like. Advantageously, all of the adjustments to be made in accordance with the invention can be done by treating only the oxide phase.

The nature and constituents of a mixed low-level waste stream can vary significantly. However, a typical waste stream will include Group I metals such as sodium, potassium and cesium in various metallic, oxide, sulfide, carbonate or halide forms, some of which may be radioactive; Group II metals such as magnesium, calcium, strontium, barium and radium, again in various metallic, oxide, sulfide, carbonate, halide and radioactive forms; Transition metals such as vanadium, chromium, zirconium, magnesium, molybdenum, iron, cobalt, nickel, copper, zinc, cadmium, lead, mercury, including the lanthanides and actinides such as cerium, uranium and plutonium in various metallic, oxide and radioactive forms; and toxic materials such as arsenic, hydrogen cyanide, benzene, PCB's and the like. Many of the constituent elements and chemicals in the waste stream will occur in the form of debris and sludges such as contaminated pipes, cement chunks, diatomaceous earth, oils, greases, spent catalysts, contaminated glassware, clothing, gloves, wood and metal debris from structures, furniture and the like, cellulose, plastics such as PVC, polyethylene, neoprene rubber and the like.

Once melted in the molten bath the various constituents in the bath commence to seek equilibrium and move to the phases at which they are most stable. Various metals in the waste stream, such as iron, nickel, cobalt, molybdenum, tungsten, tin and copper will generally be more stable in their metallic state at the temperatures within the reaction vessel. Of course, the particular metal waste constituents that seek equilibrium in the metallic phase will vary depending upon the temperature, pressure, and the other constituents in the metallic and oxide phases. Other metals will tend to volatize, seeking equilibrium in the gas phase. For example, lead, zinc and mercury will tend to volatize once introduced into the molten bath, even if they were oxidized in the pre-heating process. Of course, as noted, depending on the temperature and other constituents in the metallic phase, it is possible to trap them in the metallic phase if desired. Finally, many of the constituents of the waste stream will seek equilibrium in the oxide phase. These typically include the Group I and Group II metals, for example, the oxides of sodium, potassium, cesium, magnesium, calcium, barium, radium, and strontium; many of the transition metals, such as the oxides of titanium, chromium, manganese, cadmium, and silver; most of the actinides and lanthanides; and other elements such as any remaining halogens, arsenic, phosphorus and silicon. Advantageously, the lanthanides, actinides and group II metals are where many of the radioactive constituents of the waste streams of particular concern lie, such as cerium, radium, plutonium and uranium.

In general, if the target element is one that is desirably sequestered, then it is important to retain it in the oxide phase. However, its concentration per unit volume of the oxide phase may be too high to fall within LDR requirements, especially if it naturally tends to exist in the oxide form. Similarly, its concentration per unit volume of oxide may be well below regulatory requirements, so that in order to maximize the effective use of the sequestrant, its concentration should be increased. In order to adjust the concentration of the target element in the oxide phase, the reducing potential of the oxide phase, i.e., the ability of the oxide phase to reduce the target element or elements into the metallic state, is adjusted.

In particular, if the target element exists predominantly in the oxide phase, and the reducing potential of the oxide phase is increased, the target element is reduced to its metallic state and moves to the metallic phase, thereby decreasing its concentration in the oxide phase. This can be accomplished by addition of a reducing agent and/or by changing the temperature and pressure of the molten bath. Suitable reducing agents include carbon, coke and hydrocarbon gas. Preferably, the reducing agent is natural gas. However, for purposes of the invention, a reducing agent is any substance that reduces the oxidation state, i.e., reduces the positive valence, of the target element or elements. Preferably, the reducing agent is introduced directly to the oxide phase. Similarly, if the target element tends to exist in the metallic phase, its concentration in the oxide phase can be increased by adjusting the oxide phase to a negative reducing potential for that element with the introduction of an oxidizing agent and/or a change in temperature. Preferred oxidizing agents are oxygen gas and carbon dioxide, although any material that will increase the oxidation state, i.e., positive valence, of the target element is contemplated. In the preferred embodiment, the oxidizing agent is introduced directly into the oxide phase in order to shift the equilibrium of the system causing transfer of the target element from the metallic phase to the oxide phase.

In instances where it is desirable to sequester the target element in the oxide phase, but increasing the reduction potential causes it to volatize in the metallic state, the volatile constituent can be recaptured by the oxide phase upon oxidation in the gas phase. Again, this can be accomplished by controlling the reducing potential of the oxide phase, which is in intimate contact with the gas phase.

In accordance with another aspect of the invention, it may be desirable to precipitate various metal components of the waste stream into the metallic phase for subsequent recovery. As described above, if the target element exists in the oxide phase, it can be driven to the metallic phase by introduction of a reducing agent and/or by adjusting the temperature in the molten bath.

In some instances, the free energy of formation of the oxide of the target element may be such that, under the conditions in the reactor vessel, it will simply not be possible to drive the element into the metallic phase. In these instances, the concentration of the target element in the oxide phase can be adjusted by increasing or decreasing the amount of oxide. For example, while not wanting to be bound by theory, the group II metal, calcium, will not be reduced into the metallic phase under the conditions in the reactor vessel regardless of how much reducing agent is introduced. Accordingly, if the amount of calcium is to be limited in the final sequestered product, its concentration is reduced by introducing additional oxide sequestrant material.

Advantageously, the inventive method also enables the control over the nature and form of the sequestrant. As used herein "sequestrant" or "sequestrant" means the component or components of the oxide phase that sequester the target element or elements in the final product. The particular morphology that the oxide phase in general, and the sequestrant in particular, will assume upon solidification can range from vitreous which, as used herein refers to a solid solution or glass, to purely or predominantly crystalline. In some instances, because of economics or because of the particular nature of the target waste, sequestration in a vitreous solid will suffice and satisfy regulatory requirements. However, in many instances, the preferred means of sequestration will be in a crystalline solid. This is especially advantageous when it is important that the product be non-leachable for disposal purposes because the target element is incorporated directly into the crystal lattice of the final product. This can be particularly useful when the target element is radioactive. Depending on the nature and relative amounts of crystalline sequestrant and radioactive waste element, the sequestrant forms a self-shielding "container" for the radioactive waste as the final product. Since the preferred sequestrants form hard, non-leachable and non-reactive crystalline structures, the product is especially suitable for long term disposal of nuclear wastes.

Preferred sequestrants form hard, non-reactive, non-leaching crystalline structures capable of incorporating the target element. Especially preferred sequestrants are aluminas, such as mullite, corundum and spinels. In addition, zirconias, magnesias, ferrites, pore-free polycrystalline oxides formed from yttria, or other oxides that are capable of forming mullite-like and spinel-like crystalline structures may be used. Advantageously, many mixed waste streams include regulated waste metals that will form spinels with the oxide phase. For example, cerium, chromium, nickel, lead, cadmium and cesium will tend to form spinel-like solid crystalline structures with alumina and similar oxides. Of course, because of the conditions in the reactor, it is impossible to assure that all of the drawn off oxide phase will be non-vitreous. However, it is contemplated within the invention that, when it is desired to sequester the target waste in a crystalline solid, the oxide phase should be controlled to exhibit as little vitreous matter as possible.

The conditions in the reactor can be controlled in accordance with the method of the invention to thereby control the morphology of the sequestrant upon solidification. By increasing the reduction potential of the oxide phase, those elements that tend to cause the oxide to form a vitreous solid can be driven out of the oxide phase and into the metallic or gas phases. In this way, it is possible to ensure that the oxide sequestrants form a crystal lattice upon solidification, and that the target material is fixed or locked within the crystal lattice. For example, if the desired sequestrant is mullite $(3Al_2O_3 \cdot 2SiO_2)$ the oxide phase will include alumina and silica. As the waste stream is introduced and the reactions proceed, the silica content of the oxide phase will change. As long as the ratio of alumina to silica in the oxide phase is 1:1 or less, the sequestrant will generally solidify in the form of a solid crystalline structure. However, as the amount of silica increases, for example because it is being introduced in the waste stream, the oxide phase will shift toward the formation of a vitreous glass solid. While not wanting to be bound by theory, glass is more reactive and it is believed that sequestration in such a vitreous solid does not provide as sound protection against leaching of the waste element as does locking the element into the crystal lattice of a hard, non-reactive crystalline solid, especially for long term disposal of radioactive materials.

Moreover, by reducing the tendency of the oxide phase to form a vitreous morphology, one retains superior efficiencies in the processing of the waste stream. In the case of the foregoing example, as the silica content approaches or exceeds 1:1 in the oxide phase, a viscous pre-vitreous layer forms between the metallic phase and the oxide phase, thereby hindering the ability to conduct the controlled adjustments to the composition of the oxide phase associated with the inventive method. This drastically reduces the efficiency of the process and associated cost advantages. However, with the method of the invention one can selectively adjust the alumina-silica ratio by either adding additional alumina to the oxide phase or by introducing a reducing agent into the oxide phase and thereby driving silicon into the metallic phase. In this manner, one can freely elect to sequester the target waste in the advantageous crystalline solid sequestrant or, if desired and environmentally acceptable, a vitreous solid.

Once the desired concentration of target waste or wastes, and desired morphology of the sequestrant are achieved, aliquots of the oxide phase may be tapped from the reaction vessel into molds in the known manner. Once in the molds, the oxide sequestrant is allowed to cool. In the case of a predominantly crystalline sequestrant, the rate at which the aliquot is cooled will determine the crystal size, with slower rates tending to form larger crystals. In addition, by cooling the aliquot slowly, there is a tendency for the waste to migrate toward the center of the ingot or monolith, thereby enhancing any shielding effect associated with the product and also reducing any potential for the waste element to leach out of the final product. A useful excipient in the solidification process is to add seed crystals to the tapped or poured oxide. The metallic phase can likewise be tapped or poured from the reaction vessel and depending upon the composition, be transported for further processing or for subsequent use.

In carrying out the method of the invention, the waste streams, or processed constituents thereof, are processed through various heating, handling, recycling and cleaning systems commonly employed in the steel making industry. For example, the systems and apparatus disclosed in U.S. Pat. No. 5,013,533, incorporated herein by reference, can be adapted to the present invention with little modification to comply with EPA, DOE and other regulatory guidelines, or no modification at all depending upon the waste stream. Those of ordinary skill in the art would be able to adapt and use such apparatus in accordance with the practice of the invention in view of this disclosure.

In practice, the waste stream is delivered to the facility and prepared for treatment. Although the system employed in the preferred embodiment can accommodate relatively large feed items, the mixed waste stream is typically initially delivered to a shredder, crusher or similar sizing apparatus to ensure that the whole of the waste stream can be processed in accordance with the invention.

Once appropriately sized, the waste stream is delivered to a bulk preheater wherein some of the waste constituents, such as water, hydrocarbons and volatile metal oxides, are volatized and removed from the waste stream as off-gas for further processing. Other waste constituents may be oxidized or reduced depending upon the atmosphere in the pre-heating unit. Preferably, the pre-heating step is conducted in an oxidizing atmosphere. For this purpose, any bulk oxidation apparatus known in the art, such as a cyclone incinerator, a kiln, a fluidized bed reactor or the like, may be used. Preferably, the pre-heating apparatus is a rotary kiln.

The off-gases from the pre-heating step are processed through various dust collectors, cyclones, scrubbers and the like to remove entrained solids for subsequent use or recycling, and to treat any hazardous gases, such as gaseous sulfuric or hydrochloric acids. Any gas processing system or systems suitable for the treatment and/or recycling of off-gases to satisfy environmental regulatory guidelines will be suitable for use in conjunction with the inventive method as would be apparent to those of ordinary skill in the art in view of the instant disclosure.

From the pre-heater, the remaining waste stream is fed to the reaction vessel. Preferably, the reaction vessel is an electric arc furnace, although other furnaces, such as an induction furnace or the like, may be used. In the reaction vessel, the waste stream is combined with molten sequestrant, or alternatively, the sequestrant is derived in whole or in part from the waste stream itself, and the respective gas, oxide and metallic phases are allowed to form. Based on an analysis of the feed and vessel constituents, for example by chemical analysis, x-ray, infrared, nmr, mossbauer and mass spectrometries, chromatography, and the like, the composition of the oxide and/or metallic phases are adjusted by adjusting the reducing potential of the oxide phase. Once the desired composition of the oxide and/or metallic phases is achieved, the desired products can be tapped or poured from the vessel into molds for cooling and subsequent disposition.

Many additional features, advantages and a fuller understanding of the invention will be had from the following detailed description of preferred embodiments and the accompanying drawings.

DETAILED DESCRIPTION OF THE PREFERRED EMBODIMENTS

Figure 1:
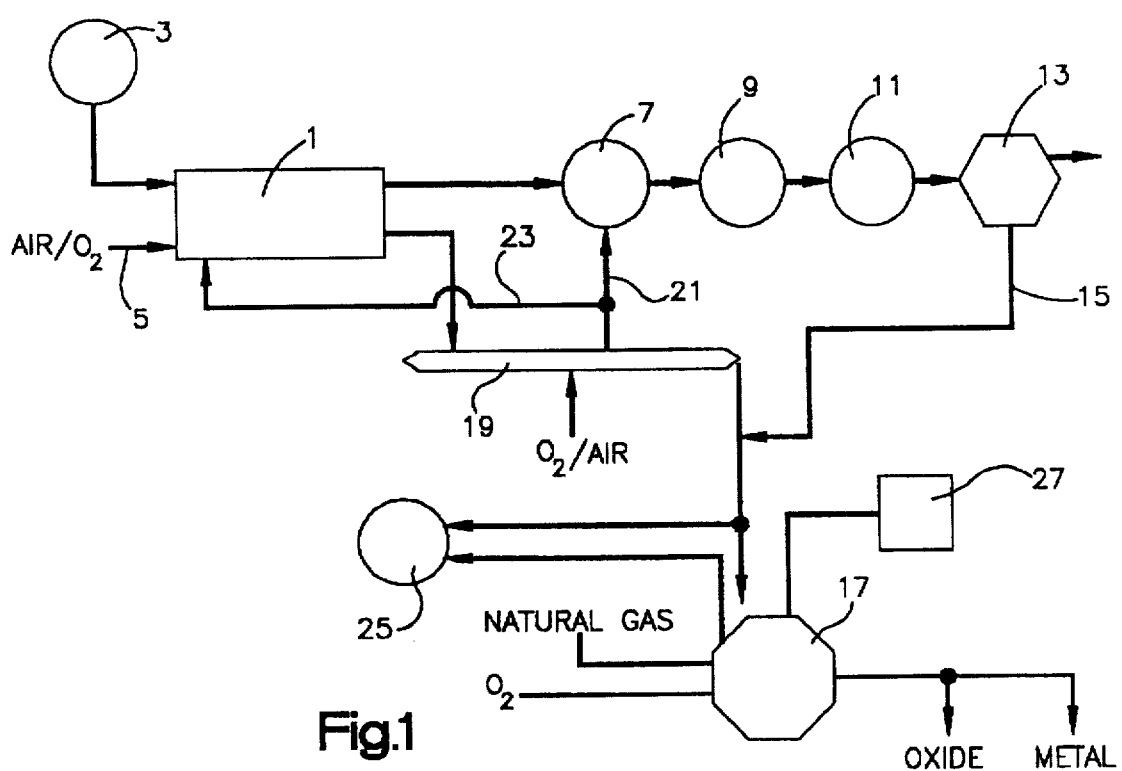
FIG. 1 is a schematic flow diagram of a system for practicing the method according to the invention.

In accordance with a preferred embodiment, and referring to FIG. 1, of the invention a waste stream, such as a MLLW stream is fed to a large kiln 1 for pre-heating, preferably in an oxidizing atmosphere. Ideally, the kiln is a large, oversized rotary kiln, enabling a large variety of sizes and shapes of waste materials to be processed. Advantageously, such a system can accommodate waste pieces on the order of 18 inches in diameter, although the size of the feed constituents is really only limited by the size of the feed port of the apparatus. The large size also enables the kiln to accommodate any sudden increases in oxidation rate thus preventing uncontrolled gas expansion, or so called "puffing."

Although a large kiln can accommodate generally larger waste materials, in practice the waste stream is sized prior to being fed to the kiln by a shredder 3. This enhances the effectiveness of the kiln to burn off those waste constituents that are subject to volatilization, and to oxidize those constituents that will oxidize. After sizing in a shredder the waste stream is introduced into the kiln by any means known in the art, for example, lock hoppers, hydraulic rams, screw feeders, lift assemblies and the like. The kiln can be continuously fed or batch fed.

The temperature in the kiln may range from about 800° F. to about 2200° F., and will preferably be in the range of from about 1200° F. to about 1600° F. Kiln 1 can be heated as is known in the art, for example by natural gas, propane or other hydrocarbon fuels. The heated oxidation gas stream can be either co-current or counter current to the flow of solids through the kiln 1. As noted, the atmosphere in the kiln is preferably oxidizing and may be selectively controlled to range from 100% air to 100% oxygen by various sensors and control computers known in the art, depending on the economics and the desired composition to be fed to the reactor. Pre-heating in an oxidizing atmosphere helps to decrease loss on ignition in the reactor, and also enhances the rate at which selected constituents will enter the oxide phase once in the reactor. With some waste streams, it may alternatively be desirable to maintain a stoichiometric or slightly reducing atmosphere. This may be desired to inhibit the production of organo-halide intermediates. In addition, or alternatively, various reagents such as magnesium may be added to inhibit the production of undesired intermediates, such as organo-halides and the like. Preferably, the pressure in the kiln will be subatmospheric, i.e., negative pressure, with appropriate seals so as to prevent fugitive emissions of the off-gases.

In the preheating kiln, some of the waste constituents are volatized and removed from the system to a gas treatment system or systems, while others are dried and oxidized. While not wanting to be bound by theory, the more volatile waste stream constituents such as sulfur, water, hydrocarbons and carbon are vaporized, while the Group I and Group II metals and many of the transition metals are oxidized. Typically, the organics (hydrocarbons) and organo-halides are volatized, with the hydrocarbons forming $H_2O$, $CO_2$ and CO gas or vapor and the organo-halides forming hydrogen halides such as HCl. Although some metal halides may be transformed to the metal oxide plus a hydrogen halide depending on the temperature and oxidation conditions, they are typically not chemically altered in the kiln, although some may be vaporized. The solid constituents of the waste stream are heated to drive off water and for oxidation, but generally remain in the solid phase. Depending on the amount and nature of the feed charged to the kiln, the residence time may be from about 15 minutes to about 6 hours. Preferably, the residence time is on the order of 2 hours. For example, if the waste stream has a low loss on ignition then the throughput can be fairly quick. If the waste stream has a high loss on ignition, then the feed rate and through-put must be slower and hence the residence time is increased because of the load on the gas handling system.

The off-gases generated in the kiln from the volatilization of sulfur, carbon, hydrocarbons, volatile metal oxides such as molybdenum trioxide and the like are treated by a gas handling system in order to ensure that emissions fall within acceptable regulatory guidelines. In addition, some of the constituents of the off-gas can be recovered and sold, while others can be collected and reintroduced into the system for further processing. Typically, the gas handling system will involve separation in one or more cyclones 7 to collect entrained solids from the off-gas, secondary combustion in, for example, a secondary combustion chamber 9 wherein gases are held at temperatures on the order of 1800° F. for a time effective to destroy any uncombusted hydrocarbons, e.g., 2 seconds, a quenching step in, for example a quench chamber 11 wherein the temperature of the gases are reduced from temperatures on the order of 1800° F. to temperatures of about 460° F. by injection of water. Particulate filtration in a bag filter wherein solids remaining in the off-gases are filtered and collected in a bag house 13, and scrubbing processes, for example, to eliminate $SO_2$ and other acid fumes and any remaining entrained solids are also typically employed. Of course, because waste streams can vary significantly and different governmental regulations apply to different waste constituents, the particular gas processing system or systems employed at a given facility may vary. Some of the solids collected in the gas handling system may be suitable for sale or further off-site processing, while others may need to be collected and routed to the reaction vessel via line 15 for further on-site processing. For purposes of the invention, the particular nature of the gas handling system or systems is not critical and it is contemplated that any system suitable to meet EPA, DOE and other regulatory requirements may be adapted for use in connection with the inventive method as would be apparent to those of ordinary skill in the art in view of this disclosure.

The solids exit the kiln 1 at temperatures ranging from 800° F. to 2200° F. The solids can be fed directly into the reaction vessel 17, they can be stored and analyzed prior to introduction into the reactor, or they can be further processed to ensure complete oxidation of those constituents that will oxidize. In a preferred embodiment, the solids are cooled and transported to the reaction vessel using a fluidized bed conveyor 19 with air, oxygen or a combination thereof as the fluidizing gas in order to achieve maximum oxidation of the feed prior to introduction into the reactor. Off-gases from the fluid bed are either processed with the off-gases from the kiln, via line 21, or used as combustion gas for the kiln via line 23. Because of the widely varying compositions of the waste streams it is desirable to sample the feed prior to introduction into the reactor in order to obtain an approximation of the feed composition using, for example, gas chromatography, x-ray, IR, NMR, mass or mossbauer spectrometry, indicated at 25. This facilitates the determination of the optimum treatment protocol in the reactor.

The feed from the kiln is fed to the reactor 17, for example, by a screw feeder, lock hopper, hydraulic ram or the like. Preferably, the reactor is an electric arc furnace, a plasma arc furnace or an electric induction furnace. Typically, the bath in the reactor will range from 6 to 10 tons, inclusive of the waste, with 2 to 4 tons of material being added and removed per treatment cycle. The material will normally be resident in the reactor for about 25 to about 70 minutes, and generally about 40 to 50 minutes, to complete a treatment cycle. Of course, depending on the nature and constituents of the waste stream, and the amount of manipulation necessary to obtain the desired product, the residence time can vary significantly as would be apparent to one of ordinary skill in the art in view of this disclosure. For example, if the target element entering the reactor is intended to be sequestered, and is already in the oxide form, little manipulation may be necessary in order to ensure a suitable waste concentration and sequestrant morphology. Thus, the process may proceed quickly. By contrast, if the object is to recover reusable heavy metals from the metallic phase, it may take more time or several treatment cycles to accumulate sufficient quantities of the desired metals in the metallic phase before the reactor can be tapped or poured. The temperature in the reactor will range from about 1650° C. to about 2800° C., preferably 1800° C. to about 2100° C., and still more preferably from about 1950° C. to about 2050° C., again depending on the control parameters employed in accordance with the inventive method. In an electric arc furnace, suitable temperatures can be maintained with 220 to 280 volts at 1800 to 3400 kilowatts of power, with 0.65–0.77 kilowatt hours per pound of charge effective to complete the cycle. Of course, this will vary significantly depending on the furnace and the nature of the charge. Preferably, the reactor operates at negative, i.e., subatmospheric, pressure for containment purposes.

In a preferred embodiment, the molten bath present in the reactor prior to addition of the waste feed consists of on the order of at least about 1 ton of the desired sequestrant material or its precursor. Still more preferably, the molten bath is alumina ($Al_2O_3$). Suitable additional components of the molten bath may include silica, zirconia, magnesia, or other spinel forming components. Additionally, molten iron from, for example, scrap, may be added depending on the desired product and reaction conditions. For example, if it is desired to precipitate the target element in the metallic phase, but it will not readily remain in the metallic phase e.g., because it immediately volatizes, then the bath may include a molten metal or reagent designed to trap the target element in the metallic phase once it is reduced out of the oxide phase.

The bath is prepared by introducing the oxide sequestrant into the vessel, in the preferred case alumina or alumina bearing material, along with carbon shorting bars. The electrodes are energized by transformer 27 and the system begins to heat. Additional alumina may be added and, once the bath has melted and developed sufficient heat to maintain the continuity of the electrodes, the bath is brought to the desired starting volume. Preferably, the starting volume of the bath is approximately one ton of molten oxide (alumina).

Advantageously, although it may be desirable to include, for example, molten scrap iron in the initial bath, the process according to the invention is not dependent upon the catalytic activities of a molten iron bath, but rather on the properties of the oxide phase. Accordingly, it is not necessary to employ a reaction vessel having expensive refractory tuyeres and reagent feed ports submerged in the molten metallic phase in the bottom of the vessel. Likewise, the waste stream can be top fed, which not only increases the variety of materials that can be fed, but again, reduces the cost of the apparatus needed to operate the system.

Methods and apparatus for the introduction of waste material, additional oxide sequestrant, reducing agents and oxidizing agents would be apparent to those of ordinary skill in the art in view of the instant disclosure. For example, solid oxidizing and reducing agents can be top fed into the reaction vessel in the normal fashion, such as by a screw feeder. Gaseous reducing and oxidizing agents can be introduced through lances or tuyeres as is known in the art of steel making. In a preferred embodiment, the lance or lances for introducing the gaseous reagents are disposed in the reactor vessel just above the level of the oxide phase. When it is desired to introduce the reagent into the oxide phase according to the preferred embodiment, the lance can be injected into the oxide phase or, in the case of a fixed lance, the vessel can be tilted so that the lance is injected into the oxide phase and the gaseous reagent introduced directly to the oxide.

Based on an chemical or spectral analysis of the components in the bath, such as by chromatographic or spectrometric apparatus known in the art, the necessary amounts of reducing and/or oxidizing agents to be added to the system to obtain the desired product composition can be stoichiometrically calculated by those of ordinary skill in the art. For example, if it is desired to sequester cerium in a crystalline mullite phase, but the incoming feed contains on the order of 35% silica, the oxide phase will tend toward the vitreous phase. However, by adding 6.04% coke per 100 pounds of feed, the silica content in the oxide phase of a 2300 pound batch can be dropped to 20% over the course of 30 minutes with 139 pounds of coke and the furnace at 240 volts, and 0.65 kilowatt hours per pound of batch. As a result, the cerium can be sequestered in an alumina rich mullite structure. In another example, a 4000 pound batch containing 1% cerium, 1.5% cesium and 10 iron can be treated to sequester the cerium, remove the cesium and drop the iron into the metallic phase. With the reactor at a voltage of 260V, and 0.7 kilowatt hours of power per pound of batch, the cesium and iron can be driven into the metallic phase, with the cesium volatizing out of the system for collection in the bag house, in about 1 hour with the addition of 4.375% coke per 100 pounds of batch, or 175 pounds of coke. Thereafter, the oxide phase can be tapped or poured for sequestration of the cerium.

If oxidation is required, the calculated amount of oxygen can be lanced into the oxide phase. Likewise, if reduction is required, the calculated amount of solid reductant, such as coke, can be top fed into the vessel, or the calculated amount of gaseous reductant, such as natural gas, can be lanced into the oxide phase. In practice, it has been found that the reducing efficiency of coke is on the order of about 80% of stoichiometric, whereas that of methane is about 60% of stoichiometric. However, methane has about three times the reducing capacity of coke. Suitable calculations for the treatment of a given waste stream are within the skill in the art in view of the instant disclosure.

Once the composition of the oxide and/or metallic phases have been adjusted as desired, by altering the oxidation potential of the oxide phase as hereinbefore described, the oxide phase and/or the metallic phase can be tapped or poured into molds and allowed to cool. If desired, seed crystals may be introduced in the oxide to enhance crystal growth. Similarly, the molds can be insulated to slow the cooling rate and crystal growth, thereby obtaining larger crystals and enhancing the propensity of the waste material to migrate toward the center of the ingot or monolith. Alternatively, depending on the target waste, the ingots may simply be allowed to air cool for about 24 to 48 hours.

Off-gases from the reactor can be treated in the gas system associated with the kiln, or in a separate gas treating system or systems as relevant regulatory guidelines deem necessary.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A method of treating a waste material comprising:
   a) forming a molten bath comprising a waste material and a fluid oxide sequestrant phase in a reaction vessel, whereby at least a portion of said waste material is interspersed in said oxide sequestrant phase;
   b) selectively adjusting the concentration of said waste material in said oxide sequestrant phase by increasing the reducing potential of said oxide sequestrant phase, increasing the amount of oxide sequestrant or both;
   c) removing at least a portion of said oxide sequestrant phase from said reaction vessel when said concentration of waste material in said oxide sequestrant phase is at a desired level, and solidifying said withdrawn oxide sequestrant phase at a rate effective to sequester said waste material therein.

2. The method according to claim 1 wherein said waste material is at least one component of a multi-component waste composition.

3. The method according to claim 2 comprising forming at least a portion of said oxide sequestrant phase by melting said waste composition.

4. The method according to claim 1 wherein said step of adjusting the concentration of waste material comprises increasing the reducing potential of said oxide sequestrant phase by introducing a reducing agent into said reaction vessel.

5. The method according to claim 1 wherein said step of adjusting the concentration of waste material comprises increasing the reducing potential of said oxide sequestrant phase by introducing a reducing agent directly into said oxide sequestrant phase.

6. The method according to claim 1 wherein said step of adjusting the concentration of waste material comprises increasing the amount of said oxide sequestrant phase by the addition of oxide sequestrant or a precursor therefor.

7. The method according to claim 1 wherein said step of adjusting the concentration of waste material comprises increasing the reducing potential of said oxide sequestrant phase by changing the temperature in the reaction vessel.

8. The method according to claim 1 comprising forming said oxide sequestrant phase predominantly from an alumina.

9. The method according to claim 8 comprising selecting said alumina so as to form mullite or a spinel upon solidification.

10. The method according to claim 1 wherein said waste material is selected to be a radioactive waste material.

11. The method according to claim 1 further comprising adjusting the composition of said oxide sequestrant phase so as to form a non-vitreous, crystalline structure incorporating said waste material upon solidification.

12. A method of treating a waste material comprising:
   a) forming a molten bath comprising a waste material and a fluid oxide sequestrant phase in a reaction vessel;
   b) selectively adjusting the concentration of said waste material in said oxide sequestrant phase by adjusting at least one of the reducing potential and amount of said oxide sequestrant phase;
   c) adjusting the composition of said oxide sequestrant phase so as to form a non-vitreous, crystalline structure upon solidification;
   d) removing at least a portion of said oxide sequestrant phase from said reaction vessel when said concentration of said waste material in said oxide sequestrant phase is at a desired level, and solidifying said withdrawn oxide sequestrant phase at a rate effective to sequester said waste material within said non-vitreous, crystalline structure of said oxide sequestrant phase.

13. The method according to claim 12 wherein said waste material is at least one component of a multi-component waste composition.

14. The method according to claim 12 comprising forming at least a portion of said oxide sequestrant phase by melting said waste composition.

15. The method according to claim 12 wherein said step of adjusting the concentration of waste material comprises increasing the reducing potential of said oxide sequestrant phase.

16. The method according to claim 12 wherein said step of adjusting the concentration of waste material comprises increasing the reducing potential of said oxide sequestrant phase by introducing a reducing agent directly into said oxide sequestrant phase.

17. The method according to claim 12 wherein said step of adjusting the concentration of waste material comprises decreasing the reducing potential of said oxide sequestrant phase.

18. The method according to claim 12 wherein said step of adjusting the concentration of waste material comprises decreasing the reducing potential of said oxide sequestrant phase by introducing an oxidizing agent directly into said oxide sequestrant phase.

19. The method according to claim 12 comprising forming said oxide sequestrant phase predominantly from an alumina.

20. The method according to claim 19 comprising selecting said alumina so as to form mullite or a spinel upon solidification.

21. The method according to claim 12 comprising forming said oxide sequestrant phase from a composition comprising alumina and silica, and wherein said step of adjusting said composition of said oxide sequestrant phase to form a non-vitreous, crystalline structure upon solidification is performed by increasing the ratio of alumina to silica in said oxide sequestrant phase.

22. The method according to claim 12 comprising adjusting said composition of said oxide sequestrant phase to form a non-vitreous, crystalline structure upon solidification by increasing the reducing potential of said oxide sequestrant phase.

23. A method of treating a multi-component waste composition, said method comprising:

a) pre-heating said waste composition to volatize at least one component thereof;

b) after said pre-heating, charging at least a portion of said waste composition to a reaction vessel and forming a molten bath therein, said molten bath comprising at least a portion of said waste composition and a fluid oxide sequestrant phase;

c) selectively adjusting the concentration of at least one component of said waste composition in said oxide sequestrant phase by adjusting at least one of the reducing potential and amount of said oxide sequestrant phase;

d) removing at least a portion of said oxide sequestrant phase from said reaction vessel when said concentration of said at least one component of said waste composition in said oxide sequestrant phase is at a desired level, and solidifying said withdrawn oxide sequestrant phase at a rate effective to sequester said at least one component of said waste composition within said solidified oxide sequestrant phase.

24. The method according to claim 22 wherein said charging is conducted after said waste has been cooled and analyzed.

25. The method according to claim 23 wherein said pre-heating is in an oxidizing atmosphere.

26. The method according to claim 23 further comprising, after preheating, oxidizing said waste in a fluidized bed prior to charging said waste to said reaction vessel.

27. The method according to claim 23 comprising forming at least a portion of said oxide sequestrant phase by melting said waste composition.

28. The method according to claim 23 wherein said step of adjusting the concentration of waste material comprises increasing the reducing potential of said oxide sequestrant phase.

29. The method according to claim 23 wherein said step of adjusting the concentration of waste material comprises increasing the reducing potential of said oxide sequestrant phase by introducing a reducing agent directly into said oxide sequestrant phase.

30. The method according to claim 23 wherein said step of adjusting the concentration of waste material comprises decreasing the reducing potential of said oxide sequestrant phase.

31. The method according to claim 23 wherein said step of adjusting the concentration of waste material comprises decreasing the reducing potential of said oxide sequestrant phase by introducing an oxidizing agent directly into said oxide sequestrant phase.

32. The method according to claim 23 comprising forming said oxide sequestrant phase predominantly from an alumina.

33. The method according to claim 32 comprising selecting said alumina so as to form mullite or a spinel upon solidification.

34. The method according to claim 23 comprising forming said oxide sequestrant phase predominantly from an alumina, and further comprising adjusting said composition of said oxide sequestrant phase to form a non-vitreous, crystalline structure upon solidification.

35. The method according to claim 23 comprising adjusting said composition of said oxide sequestrant phase to form a non-vitreous, crystalline structure upon solidification by increasing the reducing potential of said oxide sequestrant phase.

* * * * *